US012255390B2

(12) United States Patent
Kenkel et al.

(10) Patent No.: US 12,255,390 B2
(45) Date of Patent: Mar. 18, 2025

(54) MICROPHONE ANTENNA FOR WIRELESS MICROPHONE APPLICATIONS

(71) Applicant: Shure Acquisition Holdings, Inc., Niles, IL (US)

(72) Inventors: Mark Allen Kenkel, Schaumburg, IL (US); Charles V. Wiseman, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 123 days.

(21) Appl. No.: 17/884,195

(22) Filed: Aug. 9, 2022

(65) Prior Publication Data

US 2023/0060856 A1 Mar. 2, 2023

Related U.S. Application Data

(60) Provisional application No. 63/236,433, filed on Aug. 24, 2021.

(51) Int. Cl.
*H01Q 1/44* (2006.01)
*H01Q 1/22* (2006.01)
(Continued)

(52) U.S. Cl.
CPC ............ *H01Q 1/44* (2013.01); *H01Q 1/2291* (2013.01); *H01Q 9/16* (2013.01); *H01Q 9/42* (2013.01); *H04R 1/04* (2013.01); *H04R 2420/07* (2013.01)

(58) Field of Classification Search
CPC ...... H04R 2420/07; H04R 1/406; H04R 9/08; H04R 1/04; H04R 1/083; H04R 1/00;
(Continued)

(56) References Cited

U.S. PATENT DOCUMENTS

| | | | |
|---|---|---|---|
| 2,840,694 | A | 6/1958 | Morgan |
| 3,718,862 | A | 2/1973 | Norris |

(Continued)

FOREIGN PATENT DOCUMENTS

| | | | |
|---|---|---|---|
| CN | 11441623 | A | 9/2003 |
| CN | 1209767770 | U | 12/2019 |

(Continued)

OTHER PUBLICATIONS

Nov. 17, 2022—(WO) International Search Report and Written Opinion—App PCT/US2022/074812.

*Primary Examiner* — Monica C King
(74) *Attorney, Agent, or Firm* — Banner & Witcoff, Ltd.

(57) ABSTRACT

A wireless apparatus (such as a wireless microphone) utilizes an antenna comprising at least one element, which also supports a mechanical feature, an electrical circuit feature, or an ornamental feature. When an element is incorporated into an antenna, the element also continues to support its original feature. Embodiments may support different antenna types, including a half wave dipole and an inverted-F antenna that may be configured at different frequency bands suitable for Bluetooth® and WiFi® services. Embodiments support a wireless microphone that utilizes an antenna comprising a grille assembly and a chassis housing, where the grille assembly and the chassis housing are separated by an electric insulator. The RF output of a transmitter is electrically connected to the grille assembly while a grounding point of the transmitter is electrically connected to the chassis housing.

27 Claims, 6 Drawing Sheets

(51) Int. Cl.
*H01Q 9/16* (2006.01)
*H01Q 9/42* (2006.01)
*H04R 1/04* (2006.01)

(58) Field of Classification Search
CPC ........ H04R 1/08; H04R 1/06; H04R 2420/09; H04R 3/00; H04R 3/005; H01Q 1/50; H01Q 1/2291; H01Q 1/36; H01Q 5/50; H01Q 1/27; H01Q 1/362; H01Q 11/08; H01Q 5/357; H01Q 1/22; H01Q 1/273; H01Q 1/088; H01Q 1/24; H01Q 1/243; H01Q 1/52; H01Q 9/16
See application file for complete search history.

(56) References Cited

U.S. PATENT DOCUMENTS

| | | | | |
|---|---|---|---|---|
| 3,720,874 | A * | 3/1973 | Gorcik | H04B 1/385 455/90.3 |
| 4,344,184 | A | 8/1982 | Edwards | |
| 8,139,796 | B2 | 3/2012 | Nakashima et al. | |
| 9,749,725 | B2 | 8/2017 | Naito et al. | |
| 10,230,153 | B2 | 3/2019 | Zachara et al. | |
| 10,230,159 | B2 | 3/2019 | Zachara et al. | |
| D889,442 | S | 7/2020 | Bovin et al. | |
| D895,583 | S | 9/2020 | Smith et al. | |
| 2003/0118204 | A1 | 6/2003 | Kawasaki et al. | |
| 2007/0025567 | A1 | 2/2007 | Fehr | |
| 2011/0211714 | A1 | 9/2011 | Plath | |
| 2016/0142802 | A1 | 5/2016 | Naito et al. | |
| 2020/0076053 | A1* | 3/2020 | Zachara | H01Q 1/50 |
| 2022/0103930 | A1* | 3/2022 | Zhang | H04R 1/023 |

FOREIGN PATENT DOCUMENTS

| | | | | |
|---|---|---|---|---|
| CN | 210629778 | U | 5/2020 | |
| CN | 211184199 | U | 8/2020 | |
| JP | H03110902 | A | 5/1991 | |
| JP | 3640744 | B2 | 4/2005 | |
| JP | 2006148948 | A | 6/2006 | |
| JP | 4812575 | B2 | 11/2011 | |
| KR | 20080003663 | U | 9/2008 | |
| WO | 2008032684 | A1 | 3/2008 | |
| WO | 2014108990 | A1 | 7/2014 | |
| WO | WO-2023200096 | A1 * | 10/2023 | G06F 1/16 |

* cited by examiner

300

MICROPHONE ANTENNA FOR WIRELESS MICROPHONE APPLICATIONS

This application claims priority to provisional Application No. 63/236,433 filed Aug. 24, 2021, which is incorporated by reference in its entirety herein.

BACKGROUND

A wireless apparatus, such as a wireless microphone, needs some form of antenna to transmit and/or receive wireless signals. However, the antenna typically is made up of additional components that add to the manufacturing cost and complexity and that take up extra space internal or external to the apparatus. Moreover, with an external antenna, the wireless apparatus often requires additional mechanical protection to prevent damage to the antenna if the apparatus is dropped, further increasing product cost and complexity.

SUMMARY

This summary is provided to introduce a selection of concepts in a simplified form that are further described below in the Detailed Description. This Summary is not intended to identify key features or essential features of the disclosure.

A wireless apparatus utilizes an antenna comprising one or more elements (which may each be an electrically conductive element, e.g., each be made of an electrically conductive material such as a metallic material, and/or a non-metallic conductive material such as graphite) that contributes to antenna functionality, in which the at least one element also supports a mechanical (e.g., structural) feature, an electrical circuit feature, and/or an ornamental feature. When one or more such elements are incorporated into an antenna, the element(s) may also continue to support its/their original feature(s). Each element may include, for example, a chassis, grille, label, housing, trim, battery casing, printed circuit board (PCB) ground plane, electrolytic capacitor casing, attachment clip, and so forth.

According to some aspects of the present disclosure, a transceiver, transmitter, or receiver of a wireless apparatus generates and/or receives a radio frequency (RF) signal to and/or from an antenna comprising one or more elements and that may be configured to operate within a specific frequency band. The frequency band may be any frequency band. For example, the frequency band may be appropriate to support Bluetooth® or WiFi® services.

According to further aspects of the disclosure, the antenna for the wireless apparatus may support a dipole antenna. The dipole antenna may comprise at least two elements such as a first element and a second element, where each of the first and second elements corresponds to a respective different half of the dipole. For a half wave dipole, for example, each of the first and second elements may be approximately a quarter wavelength along one of its dimensions. A transceiver, transmitter, or receiver may be electrically connected to each of the two elements via an electrically conductive connection such as a metal screw, metal spring, wire, cable, and so forth.

According to further aspects of the disclosure, the antenna for the wireless apparatus may be an inverted-F antenna. The inverted-F antenna may comprise at least one element such as a first element, where the first element may be, for example, approximately a quarter wavelength along one of the antenna's dimensions. A transceiver, transmitter, or receiver may be electrically connected to the element at a feed point of the antenna, while one end of the element may be electrically connected to a grounding point of the wireless apparatus.

According to further aspects of the disclosure, a wireless microphone utilizes an antenna that may comprise a first element (such as a grille assembly of the wireless microphone) and a second element (such as a chassis housing of the wireless microphone), where the grille assembly and the chassis housing may be electrically separated by an electrical insulator. The RF output of a transmitter of the wireless microphone may be electrically connected to the grille assembly while a grounding point of the transmitter may be electrically connected to the chassis housing.

According to further aspects of the disclosure, a matching circuit may be inserted between an antenna and a transmitter to help match the impedance of the antenna and the output impedance of the transmitter. Similarly, a matching circuit may be inserted between an antenna and a receiver to help match the impedance of the antenna and the input impedance of the receiver. Similarly, a matching circuit may be inserted between an antenna and a transceiver (which may include the above-mentioned transmitter and receiver) to help match the impedance of the antenna and the input and/or output impedances of the transceiver.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

A wireless apparatus (for example, a wireless microphone) may utilize an antenna comprising at least one element (component), which also supports a mechanical feature, an electrical circuit feature, or an ornamental feature. When an element is incorporated into an antenna, the element may also continue to support its original feature unrelated to the function of the antenna. In other words, a particular portion (an electrically conductive element) of the wireless apparatus supports both the original feature for which the portion is intended as well as an antenna feature. An element may assume different forms, including but not limited to, a chassis, grille, label, housing, trim, battery casing, printed circuit board (PCB) ground plane, electrolytic capacitor casing, attachment clip, and the like.

Figure 1:
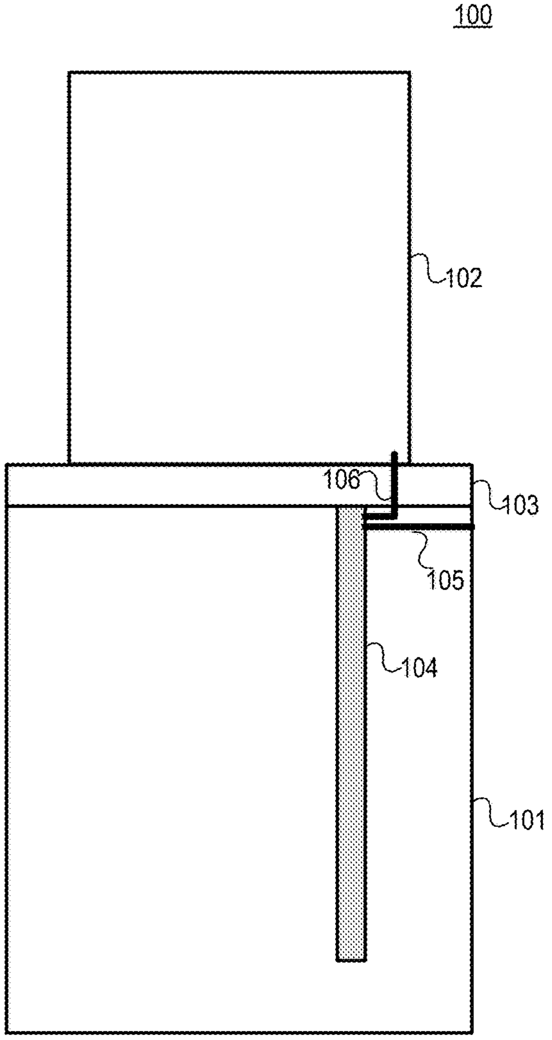
FIG. 1 shows an example of a wireless microphone in accordance with one or more aspects described herein.

FIG. 1 shows a side cross section of an example portable wireless microphone 100 comprising chassis assembly 101 (which also may be referred to as a chassis housing or a chassis) and microphone grille 102. Chassis assembly 101 may be of any shape, such as cylindrical, spherical, a cone, a cube, a prism, a pyramid, and/or any other three-dimensional regular or irregular, geometric or non-geometric, shape. Chassis assembly 101 at least partially houses circuitry, which is located on printed circuit board (PCB) 104, and a battery (not explicitly shown). Microphone grille 102 allows air exchange into and out of microphone 100 so that an acoustic audio wave traveling through the air can be more efficiently received by a microphone element of wireless microphone 100 and converted to an electrical signal by the circuitry. Each of chassis assembly 101 and grille assembly 102 may comprise an electrically conductive material, such as metal.

It may be desirable to support a small portable wireless microphone (such as wireless microphone 100) with an integrated Bluetooth® or other transceiver with a metal form factor for mobile wireless audio/visual capabilities and/or recording applications. A metal form factor may provide quality construction and improved durability; however, a metal form factor may also interfere with an antenna internal to the microphone by absorbing or reflecting radio frequency waves that would otherwise be received by the internal antenna or that would be transmitted via the antenna. Thus, it is not unusual for metal-housed radio circuitry to use external antennas with one or more physical radiating elements external to the housing. However, such external antennas can be less durable and cause the microphone to be larger than desirable. In order to reduce portable transceiver size and/or maximize durability, rather than using traditional external radiating antenna elements, the electrically conductive (e.g., metal) microphone grille (such as grille 102), electrically conductive (e.g., metal) circuit chassis assembly (such as chassis assembly 101), and/or other electrically conductive (e.g., metal) parts of the microphone that already serve other purposes (such as by housing portions of the microphone) may be used to form one or more antenna elements. For example, grille 102 and chassis assembly 101 may each be used as dipole antenna elements of an antenna of microphone 100.

Chassis assembly 101 and grille 102 may be used to form an antenna such as a dipole antenna (for example, a 2.4 GHz dipole antenna) by, for example, feeding an RF signal internally generated by the circuitry of microphone 100 to the grille assembly 102 through electrical connection 106 and grounding the internal RF circuit boards on PCB 104 to the chassis assembly 101 through electrical connection 105. Grille 102 and chassis assembly 101 may be electrically isolated from each other by insulator 103.

The antenna of wireless microphone 100 may be, for example, a half wave dipole antenna (where each element is approximately a quarter wavelength in one dimension), a harmonic dipole antenna (operational at odd harmonics of the fundamental frequency of a half wave dipole), an inverted-F antenna, and/or any other type of antenna. (A dipole antenna is a class of antennas producing a radiation pattern approximating that of an elementary electric dipole. An inverted-F antenna roughly corresponds to a shape of an inverted letter "F" and comprises a monopole antenna running parallel to a ground plane and grounded at one end. The inverted-F antenna is typically fed from an intermediate point at a distance from the grounded end.)

The antenna of wireless apparatus 100 may utilize, for example, its largest structural feature(s) (such as the grille assembly 102 and/or chassis assembly 101) as antenna elements, potentially providing increased antenna bandwidth over other small form factor antennas. The larger the element, the smaller the Q (corresponding an increased frequency bandwidth) that may be expected. The increased bandwidth may reduce the effects of antenna detuning when the microphone is handled or transferred to a mic clip.

Such a grille-chassis antenna (comprising, in this example, chassis assembly 101 and grille assembly 102) may be configured as a dipole antenna structure, and may have a sufficiently high radiation efficiency and/or increased transmission and/or reception range in numerous typical performance applications.

The antenna (such as the grille-chassis antenna) may be adapted to one or multiple frequency bands as desired such as, but not limited to, 2.4 GHz (corresponding to Bluetooth® and/or WiFi® services) and/or 5.8 GHz (corresponding to WiFi services). Where a selected element has a dimension (length, width, or depth) of approximately $\lambda/4$, then it may be expected that $\lambda$ is the wavelength of operation. However, when the Q of an element is lower (for example, with a greater width), the approximation to $\lambda/4$ may be relaxed.

When chassis assembly 101 comprises a non-conductive material (for example, plastic), a grille-ground plane antenna may be formed from grille assembly 102 and a ground plane of PCB 104 (rather than chassis assembly 101), where the ground plane has at least one dimension of approximately $\lambda/4$ and where $\lambda$ is the wavelength of operation. Different antenna configurations may be supported by the grille-ground plane antenna. For example, grille assembly 102 and the ground plane may each correspond to a half of a dipole antenna.

An illustrative embodiment for FIG. 1 supports a dipole antenna at approximately 2.4. GHz, where grille 102 has a diameter of approximately 18 mm and a height of approximately 34 mm, insulator 103 has a thickness of 3 mm, and chassis 101 has a diameter of 28 mm and a height of 50 mm. However, other dimensions are contemplated where the height of grille 102 and/or chassis 101 is approximately $\lambda/4$ but may be relaxed based on the Q, which is affected by the diameter of grille 102 and/or chassis 101. Because the dimensions of the dipole elements (grille 102 and chassis 101) are different, the supported antenna is configured as an off-center-fed dipole antenna.

Figure 2:
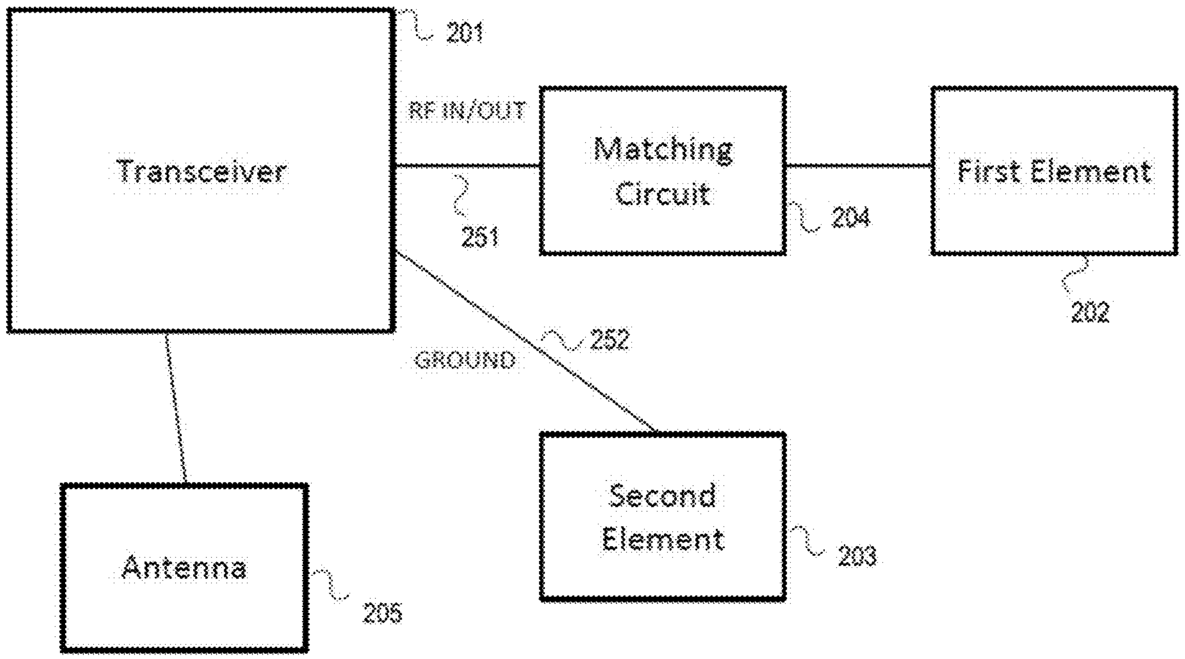
FIG. 2 shows an example of a wireless apparatus in accordance with one or more aspects described herein.

FIG. 2 shows a block diagram of another example of a wireless apparatus 200, which may, for example, be the same as wireless microphone 100 as shown in FIG. 1. Wireless apparatus 200 may comprise a transceiver 201, which may generate and/or receive RF signals through an antenna 205 comprising first and second elements 202 and 203 via electrical connections 251 and 252, respectively. Referring to FIG. 1, the first and second elements may, for example, correspond to microphone grille 102 and chassis assembly 101, respectively. Connections 251 and 252 may assume different forms, including, but not limited to, electrical cable, wire, electrically conductive screws, and electrically conductive springs. Wireless apparatus 200 may comprise a transmitter and/or a receiver rather than transceiver 201.

If the antenna comprising elements 202 and 203 is not sufficiently matched to transceiver 201, matching circuit 204 may be inserted between transceiver 201 and element 202. For example, transceiver 201 may be implemented with a particular output impedance such as 50 ohms. If the antenna impedance is 25 ohms, the resulting voltage standing wave ratio (VSWR) is approximately 2. To reduce the VSWR, matching circuit 204 may be configured to match 50 ohms to 25 ohms. However, if the antenna has an impedance sufficiently close to the transceiver impedance, matching circuit 204 may not be needed for effective operation. For example, referring to FIG. 5, the VSWR of the grille-chassis antenna shown in FIG. 1 is less than 1.5 at approximately 2.45 GHz. Consequently, operation of portable wireless microphone 100 around 2.45 GHz may not require a matching circuit such as circuit 204.

As previously mentioned, the grill-chassis antenna may be configured as a dipole antenna with microphone grille 102 forming one portion (e.g., one half and may be referred to as a first antenna feature) of the dipole and chassis assembly 101 forming the other portion (e.g., the other half and may be referred to as a second antenna feature). However, as will be discussed, other types of antennas may be formed, such as an inverted-F antenna.

Figure 3:
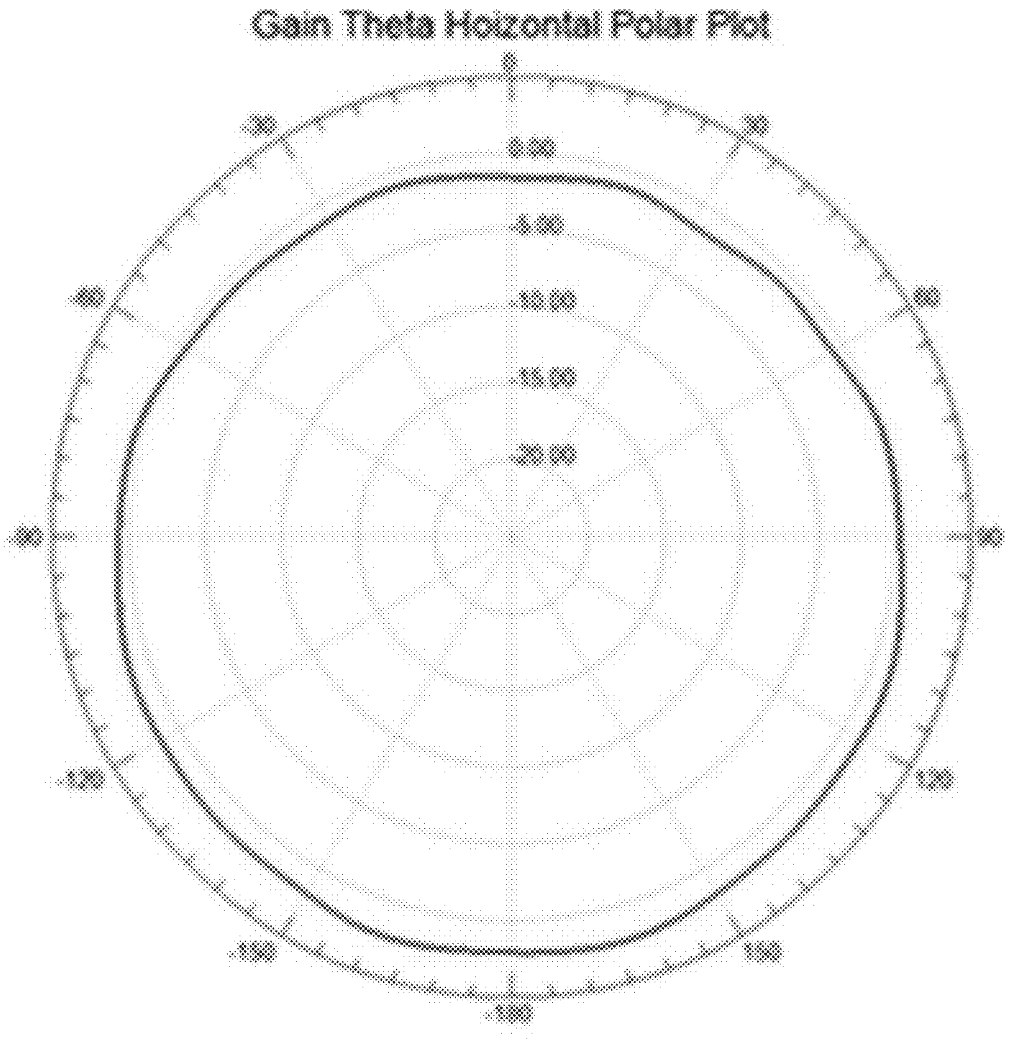
FIG. 3 shows an example of a horizontal polar plot of the radiation pattern in accordance with one or more aspects described herein.

FIG. 3 shows horizontal polar plot 300 of a radiation pattern in accordance with an aspect of the embodiments.

Figure 4:
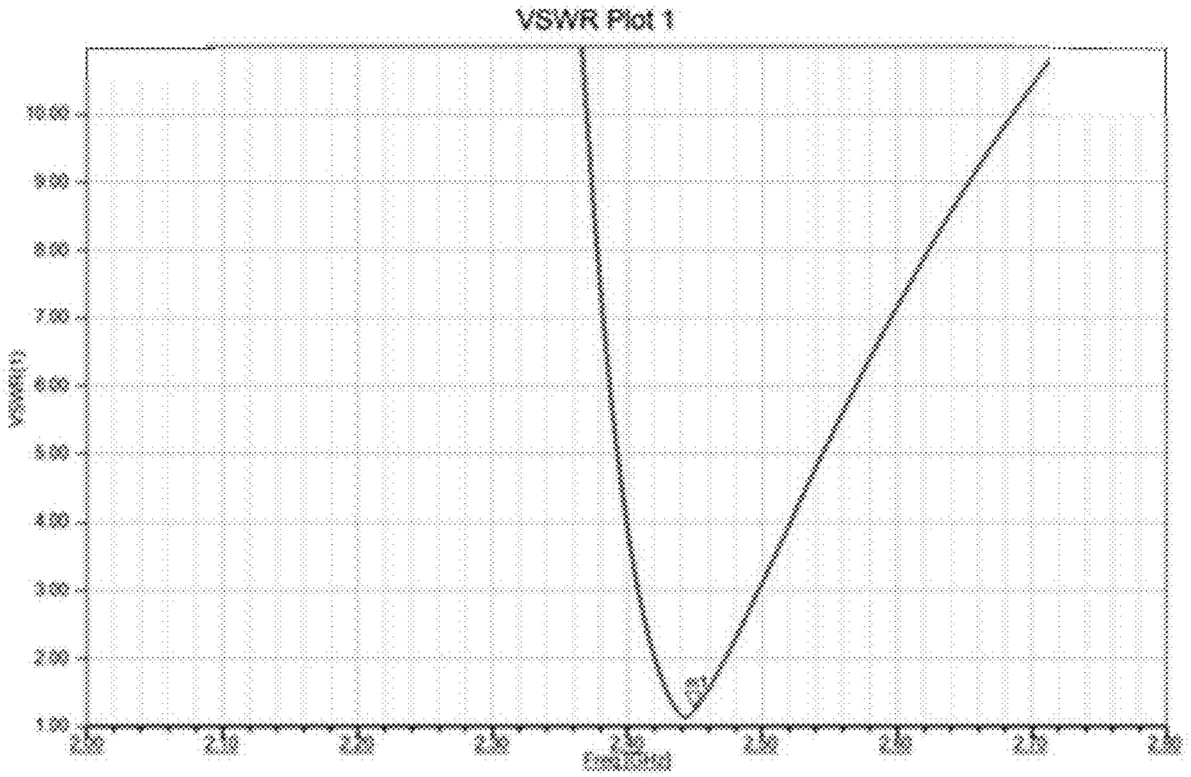
FIG. 4 shows an example of a voltage standing wave ratio (VSWR) plot of the grille-chassis antenna for the wireless microphone shown in FIG. 1 in accordance with one or more aspects described herein.

FIG. 4 shows an example voltage standing wave ratio (VSWR) plot 400 of the grille-chassis antenna for the wireless microphone 100 shown in FIG. 1. As is apparent, the grill-chassis antenna in this particular example offers a low VSWR value near 2.45 GHz, which is suitable for Bluetooth services.

Figure 5:
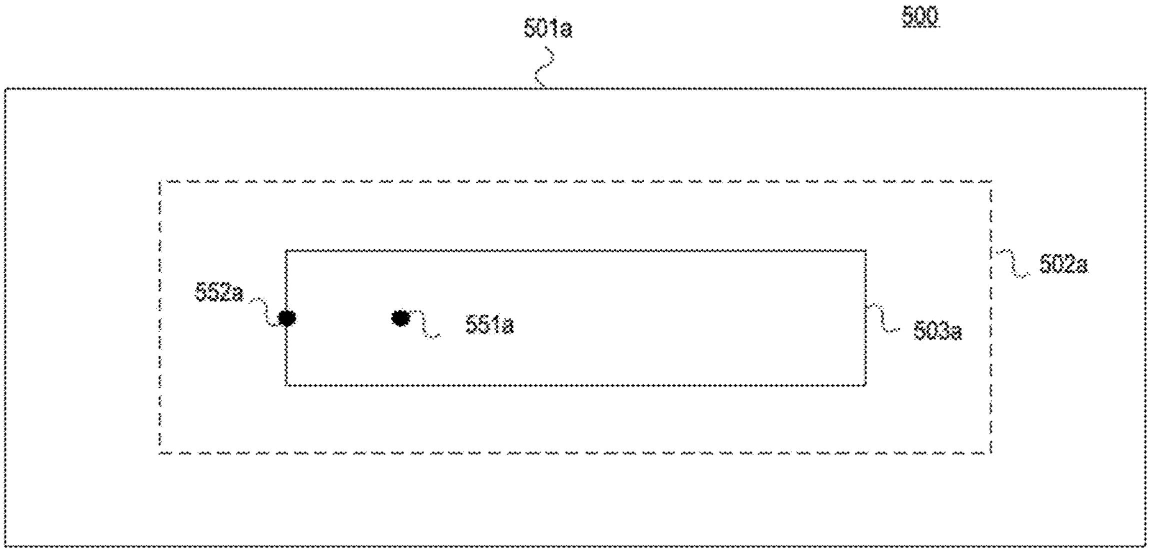
FIG. 5 shows an example of a wireless apparatus with an inverted-F antenna in accordance with one or more aspects described herein.

FIG. 5 shows a top view of an example wireless apparatus 500 in which one or more elements of wireless apparatus 500 form an inverted-F antenna. In this example, the inverted-F antenna comprises element 503*a* (which may be a radiating element of the inverted-F antenna) in accordance with an aspect of the embodiments. Element 503*a* may comprise, for example, a metallic label on outside housing 501*a* (for example, the outside housing constructed from a plastic) of wireless apparatus 500 or a metallic cover plate retaining push buttons (not explicitly shown).

A transceiver, transmitter, or receiver (not explicitly shown) may be mounted on PCB 502*a* and may be electrically connected to the inverted-F antenna through one or more electrical connections 551*a* and/or 552*a*. Connections 551*a* and 552*a* may comprise, for example, metallic screws, and may be configured as an antenna feed point and an antenna shorting pin, respectively.

Figure 6:
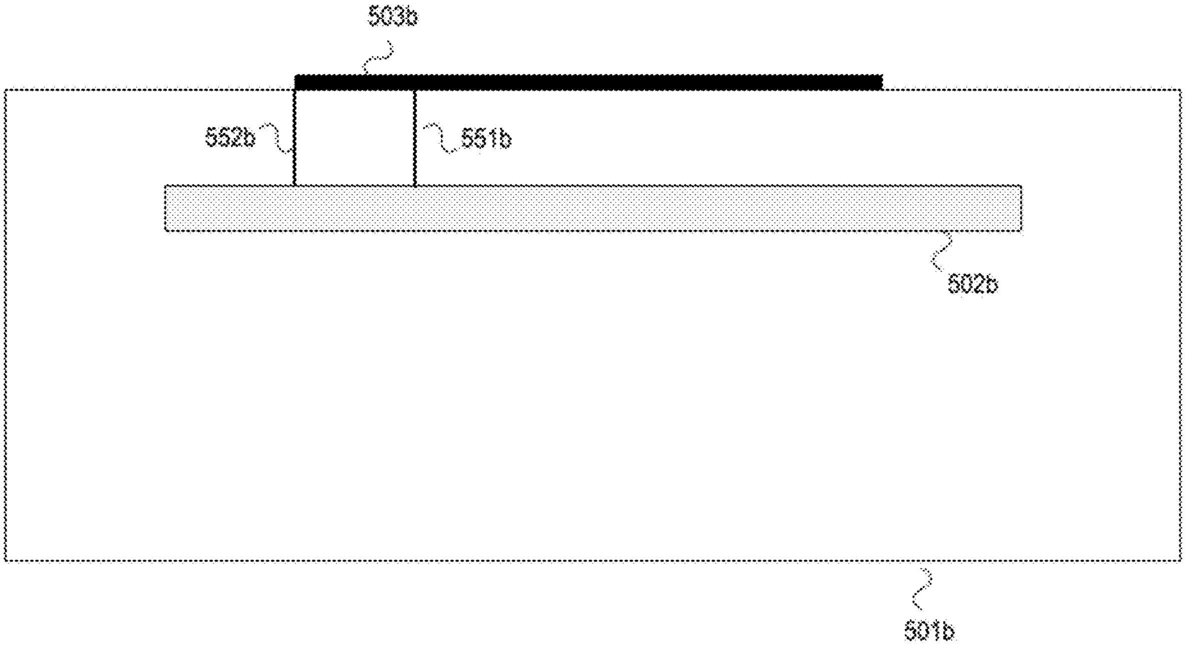
FIG. 6 shows an example of an inverted-F antenna comprising an element of the wireless apparatus shown in FIG. 5 in accordance with one or more aspects described herein.

FIG. 6 shows an example side view of wireless apparatus 500 and its inverted-F antenna that was shown in FIG. 5, where reference numbers 501*b*, 502*b*, 503*b*, 551*b*, and 552*b* are side views of the features indicated by reference numbers 501*a*, 502*a*, 503*a*, 551*a*, and 552*a*, respectively. The inverted-F antenna comprises radiating element 503*b*, shorting element 552*b*, and feed point element 551*b*.

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Exemplary Clauses

1. A wireless microphone comprising:
   a transmitter configured to generate a radio frequency (RF) signal via an antenna;
   a grille assembly;
   a chassis housing the transmitter; and
   an electrical insulation barrier disposed between the grille assembly and the chassis,
   wherein the antenna comprises the grille assembly and the chassis housing.

2. The wireless microphone of clause 1, wherein the antenna comprises a dipole antenna or an inverted-F antenna.

3. The wireless microphone of clause 1, further comprising:
   a transceiver comprising the transmitter and a receiver.

4. The wireless microphone of clause 1, wherein the antenna is configured to be compatible with at least one of a Bluetooth® service and a WiFi service.

5. The wireless microphone of clause 1, wherein the transmitter is electrically connected to each of the grille assembly and the chassis housing.

6. The wireless microphone of clause 1, further comprising a matching circuit configured to match an output impedance of the transmitter to an antenna impedance of the antenna.

7. The wireless microphone of clause 1, wherein the antenna is configured to operate in an RF spectrum between 2.4 GHz to 2.5 GHz.

8. The wireless microphone of clause 1, wherein the antenna is configured to operate in an RF spectrum between 5 GHz to 6 GHz.

9. A wireless microphone comprising:
   a transmitter configured to generate a radio frequency (RF) signal via a dipole antenna;
   a grille assembly;
   a chassis housing the transmitter, wherein the chassis housing comprises a non-conductive material; and
   a printed circuit board (PCB) comprising a ground plane,
   wherein the dipole antenna comprises the grille assembly and the ground plane.

10. The wireless microphone of clause 9, further comprising:

a transceiver comprising the transmitter and a receiver.

11. The wireless microphone of clause 9, wherein the transmitter is electrically connected to each of the grille assembly and the ground plane.

12. The wireless microphone of clause 9, further comprising a matching circuit configured to match an output impedance of the transmitter to an antenna impedance of the dipole antenna.

13. The wireless microphone of clause 9, wherein the transmitter is mounted on the PCB.

14. A wireless apparatus comprising:

a transmitter configured to generate a radio frequency (RF) signal via an antenna;

a first electrically conductive element supporting a first feature for the wireless apparatus; and a second electrically conductive element supporting a second feature for the wireless apparatus, wherein the first feature and the second feature are each different than an antenna feature, wherein the antenna comprises the first electrically conductive element and the second electrically conductive element, and wherein the RF signal from the transmitter is electrically connected to the first electrically conductive element.

15. The wireless apparatus of clause 14, wherein a grounding point of the transmitter is electrically connected to the second electrically conductive element.

16. The wireless apparatus of clause 14, further comprising:

a structure disposed between the first electrically conductive element and the second electrically conductive element, wherein the structure electrically isolates the first electrically conductive element from the second electrically conductive element.

17. The wireless apparatus of clause 14, further comprising:

a transceiver comprising the transmitter and a receiver.

18. The wireless apparatus of clause 14, wherein the first electrically conductive element and the second electrically conductive element together form at least a portion of a dipole antenna or an inverted-F antenna.

19. The wireless apparatus of clause 14, wherein the wireless apparatus comprises a wireless microphone.

20. The wireless apparatus of clause 14, further comprising a matching circuit configured to match an output impedance of the transmitter to an antenna impedance of the antenna.

21. A wireless microphone comprising an antenna, wherein the antenna comprises a first electrically conductive element that supports a first feature different from an antenna feature.

22. The wireless microphone of clause 21, wherein the first electrically conductive element comprises a chassis housing of the wireless microphone.

23. The wireless microphone of clause 21, wherein the antenna is configured to operate in a radio frequency spectrum suitable for a Bluetooth® service.

24. The wireless microphone of clause 21 further comprising:

a transmitter electrically connected to the antenna.

25. The wireless microphone of clause 24, further comprising a second electrically conductive element supporting a second feature of the wireless microphone, wherein the antenna comprises the second electrically conductive element and wherein the second feature is different from a second antenna feature.

26. The wireless microphone of clause 25, wherein the transmitter generates a radio frequency (RF) signal to the second electrically conductive element, and wherein a grounding point of the transmitter is electrically connected to the first electrically conductive element.

27. The wireless microphone of clause 25 wherein the first electrically conductive element comprises a chassis housing and the second electrically conductive element comprises a grille assembly of the wireless microphone.

28. The wireless microphone of clause 25, further comprising:

a structure disposed between the first electrically conductive element and the second electrically conductive element, wherein the structure electrically isolates the first electrically conductive element from the second electrically conductive element.

29. The wireless microphone of clause 25, wherein the first electrically conductive element and the second electrically conductive element together form at least a portion of a dipole antenna.

30. The wireless microphone of clause 21, wherein the first electrically conductive element forms at least a portion of an inverted-F antenna.

31. The wireless microphone of clause 30, wherein the first electrically conductive element comprises a metallic label on an outside apparatus of the wireless microphone.

32. The wireless microphone of clause 30, wherein the first electrically conductive element comprises a metallic cover plate retaining at least one push button of the wireless microphone.

33. The wireless microphone of clause 24, further comprising a connector, wherein the connector electrically connects the transmitter to the first electrically conductive element.

34. The wireless microphone of clause 33, wherein the connector comprises an electrically conductive screw.

35. The wireless microphone of clause 33, wherein the connector comprises an electrically conductive spring.

36. The wireless microphone of clause 24, further comprising a matching circuit configured to match an output impedance of the transmitter to an antenna impedance of the antenna.

37. The wireless microphone of clause 21, wherein the first feature comprises a mechanical feature.

38. The wireless microphone of clause 21, wherein the first feature comprises an electrical circuit feature.

39. The wireless microphone of clause 21, wherein the first feature comprises an ornamental feature.

What is claimed is:

1. A wireless apparatus comprising:

an antenna comprising:

an electrically conductive grille of a microphone, wherein the grille is configured to operate as an active component of the antenna; and an electrically conductive chassis of the microphone, wherein the chassis houses electrical circuitry configured to communicate a radio frequency (RF) signal; and an electrical insulation barrier disposed between the electrically conductive grille of the microphone and the electrically conductive chassis of the microphone.

2. The wireless apparatus of claim 1, wherein the antenna comprises a dipole antenna or an inverted-F antenna.

3. The wireless apparatus of claim 1, wherein the electrical circuitry comprises a transmitter.

4. The wireless apparatus of claim 1, wherein the antenna is configured to be compatible with at least one of a Bluetooth® service and a WiFi service.

5. The wireless apparatus of claim 3, wherein the transmitter is electrically connected to each of the grille and the chassis.

6. The wireless apparatus of claim 5, wherein the transmitter is configured to communicate the RF signal to the grille, and wherein a grounding point of the transmitter of is connected to the chassis.

7. The wireless apparatus of claim 1, further comprising a matching circuit configured to match an output impedance of the electrical circuitry to an antenna impedance of the antenna.

8. The wireless apparatus of claim 1, wherein the antenna is configured to operate in an RF spectrum between 2.4 GHz to 2.5 GHz.

9. The wireless apparatus of claim 1, wherein the electrical circuitry comprises a receiver.

10. The wireless apparatus of claim 1, further comprising a first connector and a second connector, wherein the first connector electrically connects the electrical circuitry to the grille, and wherein the second connector electrically connects the electrical circuitry to the chassis.

11. A wireless microphone comprising:
- a dipole antenna, wherein the dipole antenna comprises:
  - a grille assembly configured to operate as a first portion of the dipole antenna; and
  - a ground plane of a printed circuit board (PCB), wherein the ground plane of the PCB is configured to operate as a second portion of the dipole antenna;
- a transmitter configured to generate a radio frequency (RF) signal via the dipole antenna; and
- a chassis housing the transmitter, wherein the chassis comprises a non-conductive material.

12. The wireless microphone of claim 11, wherein the transmitter is electrically connected to each of the grille assembly and the ground plane.

13. The wireless microphone of claim 11, further comprising a matching circuit configured to match an output impedance of the transmitter to an antenna impedance of the dipole antenna.

14. The wireless microphone of claim 11, wherein the transmitter is mounted on the PCB.

15. A wireless microphone comprising an antenna, wherein the antenna comprises:
- a first electrically conductive element of the antenna that is a component of the wireless microphone; and
- a second electrically conductive element supporting a second feature of the wireless microphone that comprises at least a part of an electrically conductive grille of the wireless microphone, wherein the grille is configured to operate as an active component of the antenna.

16. The wireless microphone of claim 15, wherein the first electrically conductive element comprises a chassis of the wireless microphone.

17. The wireless microphone of claim 15, wherein the transmitter is configured to generate a radio frequency (RF) signal to the second electrically conductive element, and wherein a grounding point of the transmitter is electrically connected to the first electrically conductive element.

18. The wireless microphone of claim 15, further comprising:
- a structure disposed between the first electrically conductive element and the second electrically conductive element, wherein the structure electrically isolates the first electrically conductive element from the second electrically conductive element.

19. The wireless microphone of claim 15, wherein the first electrically conductive element and the second electrically conductive element together form at least a portion of a dipole antenna.

20. The wireless microphone of claim 15, wherein the first electrically conductive element forms at least a portion of an inverted-F antenna.

21. The wireless microphone of claim 20, wherein the first electrically conductive element comprises a metallic label on an outside apparatus of the wireless microphone.

22. The wireless microphone of claim 20, wherein the first electrically conductive element comprises a metallic cover plate retaining at least one push button of the wireless microphone.

23. The wireless microphone of claim 20, further comprising a connector, wherein the connector electrically connects the transmitter to the first electrically conductive element.

24. The wireless microphone of claim 15, further comprising:
- a transmitter configured to generate a radio frequency (RF) signal via the antenna,
- wherein the RF signal from the transmitter is electrically connected to the first electrically conductive element.

25. The wireless microphone of claim 11, wherein the antenna is configured to operate in an RF spectrum between 2.4 GHz to 2.5 GHz.

26. The wireless apparatus of claim 1, wherein the active component of the antenna is a radiating element of the antenna.

27. The wireless microphone of claim 15, wherein the active component of the antenna is a radiating element of the antenna.

* * * * *